(12) United States Patent
Weiss

(10) Patent No.: US 8,381,564 B2
(45) Date of Patent: Feb. 26, 2013

(54) CAGE NUT

(75) Inventor: Oliver Weiss, Schrozberg (DE)

(73) Assignee: Acument GmbH & Co. oHG (DE)

( * ) Notice: Subject to any disclaimer, the term of this patent is extended or adjusted under 35 U.S.C. 154(b) by 316 days.

(21) Appl. No.: 12/601,709

(22) PCT Filed: May 21, 2008

(86) PCT No.: PCT/DE2008/000871
§ 371 (c)(1),
(2), (4) Date: May 18, 2010

(87) PCT Pub. No.: WO2008/148369
PCT Pub. Date: Dec. 11, 2008

(65) Prior Publication Data
US 2010/0267456 A1    Oct. 21, 2010

(30) Foreign Application Priority Data
Jun. 6, 2007  (DE) ............... 20 2007 007 964 U

(51) Int. Cl.
*B21J 11/00* (2006.01)
*B21K 1/44* (2006.01)
*B21K 1/64* (2006.01)

(52) U.S. Cl. .................. 72/404; 470/25; 470/109

(58) Field of Classification Search .............. 72/379.2, 72/404, 405.01; 470/18, 25, 87, 109; 29/33 R, 29/34 R, 564

See application file for complete search history.

(56) References Cited

U.S. PATENT DOCUMENTS

| | | | | |
|---|---|---|---|---|
| 2,274,014 | A | * | 2/1942 | Tinnerman ............ 411/106 |
| 5,193,868 | A | | 3/1993 | O'Toole |
| 5,624,319 | A | * | 4/1997 | Golczyk et al. ............ 470/21 |
| 5,762,560 | A | * | 6/1998 | Emmett et al. ............ 470/20 |
| 6,010,289 | A | * | 1/2000 | DiStasio et al. ............ 411/174 |
| 6,988,431 | B2 | * | 1/2006 | DiStasio .................. 81/176.15 |
| 2003/0147715 | A1 | | 8/2003 | Curley, Jr. et al. |
| 2004/0013492 | A1 | | 1/2004 | Clinch et al. |
| 2004/0091333 | A1 | | 5/2004 | Clinch et al. |
| 2004/0136804 | A1 | | 7/2004 | Clinch et al. |
| 2004/0228700 | A1 | | 11/2004 | Clinch et al. |

FOREIGN PATENT DOCUMENTS
GB  530 473  1/2010

OTHER PUBLICATIONS
Search Report received in connection with corresponding German Patent Application No. 20 2007 007 964.8.

* cited by examiner

*Primary Examiner* — Dana Ross
*Assistant Examiner* — Lawrence J Averick
(74) *Attorney, Agent, or Firm* — Clark Hill PLC

(57) ABSTRACT

Cage nut having a cylindrical nut body (14) provided with a coaxial bore having an interior thread, wherein the nut body is ending in an rectangular plate (16) and, wherein the nut body (14) by means of the rectangular plate (16) is floatingly supported within a cage (12) and, wherein the entire cage nut (10), i.e. the nut body (14), and the cage (12) merely is manufactured from a single strip (100) of metal sheet by tube-forming, thread-cutting, bending and punching as well as a method for producing such a cage nut.

4 Claims, 2 Drawing Sheets

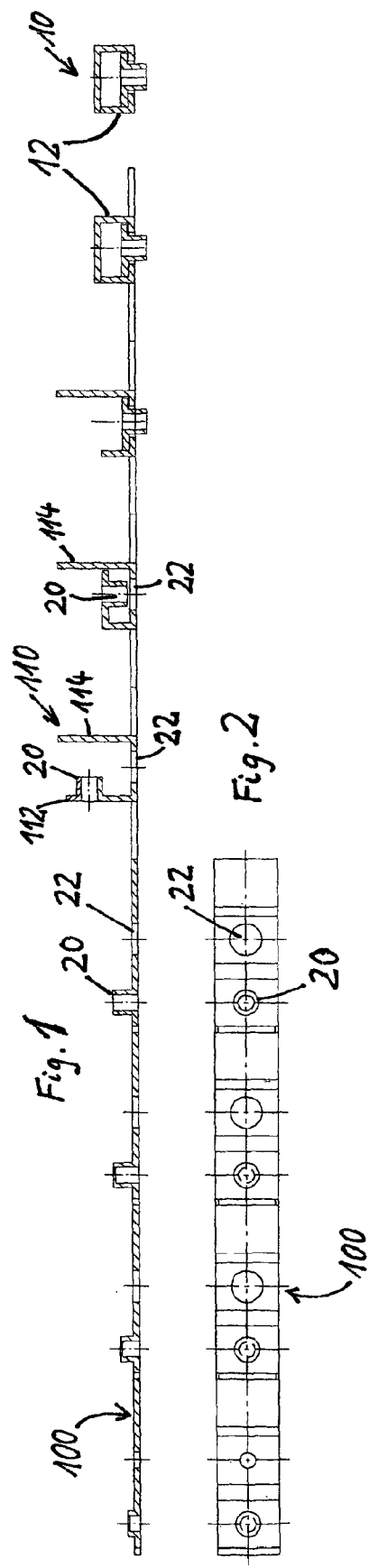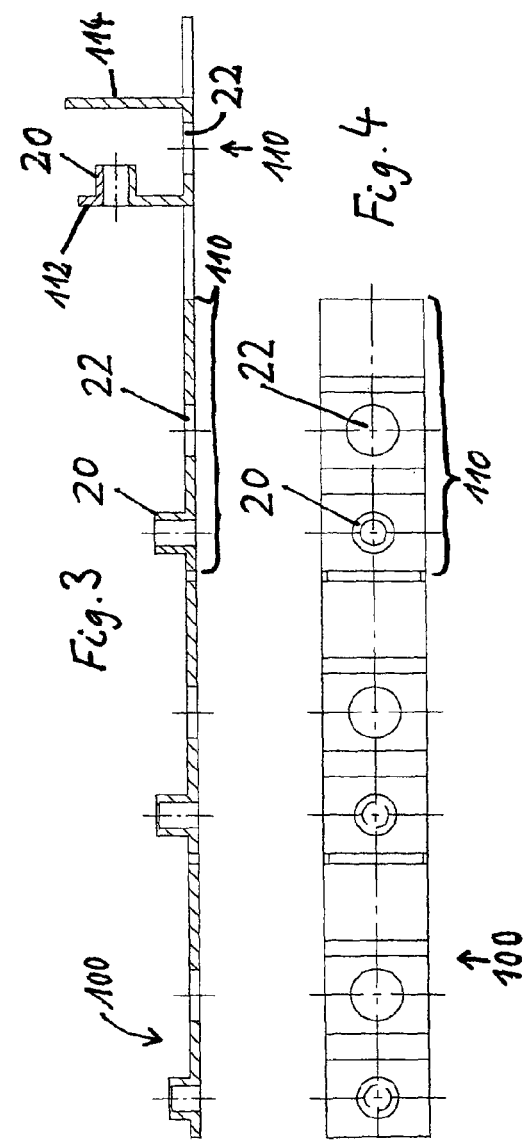

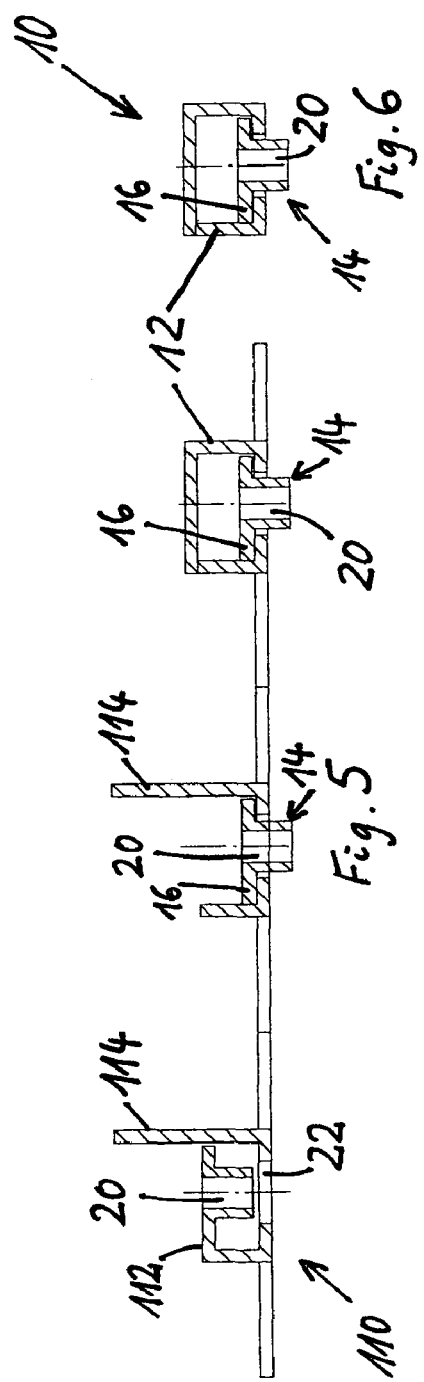

US 8,381,564 B2

CAGE NUT

RELATED/PRIORITY APPLICATION

This application is a National Phase filing regarding International Application No. PCT/DE2008/000871, filed on May 21, 2008. International Application No. PCT/DE2008/000871 relics upon German Application No. 20 2007 007 964.8, filed on Jun. 6, 2007, for priority.

The present invention is relating to a cage nut having a cylindrical nut body provided with a coaxial bore having an interior thread, wherein the nut body is ending in a rectangular plate and, wherein the nut body by means of the rectangular plate is floatingly supported within a cage.

Such cage nuts are used in the industry in a large extent. In this connection already a large number of different protective rights are existing. Only for example in this connection it is referred to the US 2004/0091333 A1, the US 2004/0013492 A1, the US 2004/0228700 A1 or the US 2004/0136804 A1. A German protective right in this connection is presented by the utility model 20 2006 003 639.3.

All these cage nuts according to the prior art however are having the disadvantage that the production of these cage nuts is extremely expensive. On the one hand, a nut body having the corresponding projections which later are keeping the nut body within the cage has to be produced. Thereafter such nut body has to be enclosed within the cage formed by bending metal sheet. Due to this expensive method of production until now cage nuts are extremely costly and therefore followingly are not used in all possible applications.

Starting out from this prior art, it is therefore the task to be solved by the present invention to provide a cage nut which can be manufactured substantially more simple, faster and less expensive and further to provide a corresponding method of production.

According to the invention, this task is solved by the features that the entire cage nut including the cage merely is produced by tube-forming, thread-cutting, bending, and punching from a single strip of metal sheet. The cage nuts according to the invention therefore can be manufactured from a single strip of metal sheet by a single run through the production machine on one single machine.

Preferably in this connection the strip of metal sheet from which the cage nuts are to be produced is having the shape of a long tape and in this strip of metal sheet firstly a tube and in a distance there-from in the longitudinal direction a circular punch-out is produced.

The distance between said tube and the punch-out in the strip of metal sheet in this connection is corresponding preferably to the sum of the height and the length of the cage to be formed.

In this connection, it is further especially preferred if the strip of metal sheet is cut or punched into sections which each are having a length of about two times the height plus three times the length of the cage to be made, wherein the cut-out is positioned in the centre of the section.

Preferably in this connection each of the sections is bent perpendicularly upward on both sides of the punch-out such that a part of the section, which is comprising the tube, as well as a further part of the section are perpendicularly bent upwardly.

Further, it is especially preferred that a part of the section, which is comprising the tube, again is bent by 90° in the same sense such that the tube is concentrically projecting into the punch-out.

In this connection it is especially preferred in the part of the section comprising the tube is cut off or punched out such that the tube is positioned within the punch-out and is penetrating the same and such that the cut-off or punched-off part is forming the rectangular plate which floatingly is supporting the nut within the cage and such that the cage is closed by a further bending of the further part of the section.

A further simplification of the manufacture of the cage nut according to the invention is achieved if the interior thread of the nut body already is provided during the shaping of the tube within the tube.

In the following, the present invention is more detailedly disclosed with reference to the exemplary embodiment shown in the attached drawings. In the drawings show:

FIG. 1 the course of all production steps of a cage nut according to the invention with the cage nut according to the invention as the final product in the survey all this shown in a side view in a cross-section along the centre axis;

FIG. 2 the strip of metal sheet according to FIG. 1 from above up to the punching-off or cutting-off of the strip of metal sheet;

FIG. 3 a detailed representation of FIG. 1 regarding the first steps of the production of the cage nut according to the invention up to the separating and the first bending of the sections;

FIG. 4 the strip of metal sheet according to FIG. 3 from above (this is corresponding to the detail of FIG. 2);

FIG. 5 a detailed representation in a larger scale of the final production steps or the cage nut according to the invention in a cross-sectional view (further detail of FIG. 1); and FIG. 6 the cage nut according to the invention in a finished state in a cross-sectional side view.

As shown in the overall view of FIG. 1, a cage nut 10 according the invention is produced from a single strip 100 of metal sheet in a single working course on a single machine.

In this connection, the four first working steps from the left are showing the widening of the tube 20 in these four steps, wherein in the last step already an interior thread can be provided within the tube and simultaneously the punching out of a circular punch-out 22 can be performed. The distance between the tube 20 and the circular punch-out 22 in the longitudinal direction of the strip 100 of metal sheet in this connection is corresponding to the sum of the height and the extension in the longitudinal direction of the future cage 12 of the nut 10.

As soon as the strip 100 of metal sheet is worked so far, the strip 100 of metal sheet is separated into singular sections 110 by punching or cutting. As this is shown in FIG. 1 and in further detail in FIG. 3, these sections 110 are having a length of about 2 times the height plus 3 times the longitudinal extension of the future cage 12. The punch-out 22 in this connection is positioned in the centre of each corresponding section 110.

As shown in FIGS. 1 and 3, now the section 110 is bent perpendicularly upward on both sides of the punch-out 22 such that a part 112 of the section 110, which is comprising the tube 20, has been bent perpendicularly upwardly. Simultaneously the part 114 of the section 110 being opposite with respect to the punch-out 22 is bent perpendicularly upwardly in the same way.

The next production step then is shown in FIGS. 1 and 5, wherein in this production step the part 112 of the section 110 carrying the tube 20 is again perpendicularly bent by 90° in the same direction such that the tube 20 now is positioned concentrically to the circular punch-out 22 and is extending in the direction thereof.

In the next working step, which is shown in FIG. 1 and in the second position from the left in FIG. 5, now the part 112 folded two times is separated by punching along the upper folding edge and is pushed downwardly such that the tube 20 now is penetrating the opening 22 and the tube 20 together with a section of the part 112 is forming the nut body 14 consisting of the tube 20 which is forming the cylindrical thread bearing part of the nut body 14 and of the part 112 which now is forming the rectangular plate 16 which in future is supporting the nut body 14 floatingly within its cage. In a last working step now the remaining upwardly bent part 114 of the section 110 again is folded in the same sense by 90° such that the former upper edge of the part 114 is positioned on the edge of the former part 112, which was created by the punching off of the nut body 14. In this way, the cage 12 of the nut 10 is closed and the nut body 14 simultaneously is received floatingly within this cage 12.

FIG. 6 is showing this final state of the cage nut according to the invention.

As far as this not yet has been done in the connection with the forming of the tube 20, even now, too, the corresponding interior thread can be formed within the tube 20 or can be cut therein.

As far as it is desired that a screw to be screwed into the cage nut 10 should be able to project from the opposite side of the cage 12 with respect to the nut body 14, then a further circular cut-out (not shown here) can be provided on the other side of the cut-out 22 opposite the tube 20. During the corresponding shaping of the tube and the related punch-out procedures corresponding weakening lines, too, can be punched into the strip 100 of metal sheet which later on are facilitating the corresponding bending of the parts 112 and 114 of the section 110.

According to the invention, for the first time a cage nut has been created which completely is manufactured from one strip of metal sheet, wherein additionally the production can be done with one procedural course on a punching and bending automated machine. A cage nut according to the invention therefore will be substantially less expensive in the production compared with the cage nut known from the prior art.

The invention claimed is:

1. A method for the production of a cage nut consisting of a cylindrical nut body having a coaxial bore provided with an interior thread which is ending in a rectangular plate and which by means of the rectangular plate floatingly is supported within a cage, wherein the entire cage nut, nut body, and cage, by means of the method steps tube-forming, thread-cutting, bending, and punching is produced from a single strip of metal sheet and, herein in the strip of metal sheet, which is having the shape of a long tape, a tube is drawn and in a distance there-from in a longitudinal direction a circular punch-out is produced and, wherein the distance between the tube and the punch-out in the strip of metal sheet is chosen corresponding to the sum of height and length of the cage and, wherein the strip of metal sheet is punched or cut into sections, which each are having a length of about two times the height plus three times the length of the cage, wherein the punch-out is positioned in the centre of the section and, the punch-out is first bent around a first axis at a first location perpendicularly upward such that a part of the section, which is comprising the tube, as well as a further part of the section perpendicularly are extending upwardly, characterized in that the part of the section, which is comprising the tube again is bent around a second axis which is parallel and distant from the first axis, such that the tube concentrically projects toward the punch-out, and after the final bending the caged nut is from a single sheet, that is consisting of an upwardly bent part and a perpendicularly further part.

2. A method according to claim 1, characterized in that the part of the section comprising the tube is cut-off or punched-off such that the tube is positioned within the punch-out and is penetrating the same and such that by the cut-off or punched-off piece of the part the rectangular plate is formed by the means of which the nut floatingly is supported within the cage and, that the cage finally is closed by a further bending of the further part of the section.

3. A method according to claim 1, characterized in that already dining the shaping of the tube a suitable interior thread is formed within the tube.

4. A method according to claim 2, characterized in that already during the shaping of the tube a suitable interior thread is formed within the tube.

\* \* \* \* \*